(12) United States Patent
Dolling et al.

(10) Patent No.: US 8,147,795 B2
(45) Date of Patent: Apr. 3, 2012

(54) PROCESS FOR PREPARING BOEHMITIC ALUMINAS HAVING A HIGH α-CONVERSION TEMPERATURE

(75) Inventors: Kai Dolling, Munsterdorf (DE); Andrea Brasch, Meldorf (DE)

(73) Assignee: Sasol Germany GmbH, Hamburg (DE)

( * ) Notice: Subject to any disclaimer, the term of this patent is extended or adjusted under 35 U.S.C. 154(b) by 100 days.

(21) Appl. No.: 10/564,244

(22) PCT Filed: Jul. 16, 2004

(86) PCT No.: PCT/EP2004/007988
§ 371 (c)(1),
(2), (4) Date: Jun. 5, 2006

(87) PCT Pub. No.: WO2005/014482
PCT Pub. Date: Feb. 17, 2005

(65) Prior Publication Data
US 2006/0246000 A1    Nov. 2, 2006

(30) Foreign Application Priority Data
Jul. 17, 2003    (DE) .................................. 103 32 775

(51) Int. Cl.
*C01F 7/00* (2006.01)
(52) U.S. Cl. .................. 423/625; 423/630; 423/631
(58) Field of Classification Search .................. 423/625, 423/626–631; 502/439
See application file for complete search history.

(56) References Cited

U.S. PATENT DOCUMENTS

| | | | |
|---|---|---|---|
| 2,903,418 A | | 9/1959 | Kirshenbaum et al. |
| 3,152,865 A | | 10/1964 | Koch et al. |
| 3,647,374 A | | 3/1972 | Nomura et al. |
| 5,455,019 A | | 10/1995 | Inui et al. |
| 5,935,275 A | * | 8/1999 | Burgard et al. ............ 23/295 R |
| 6,030,599 A | * | 2/2000 | Noweck et al. ............ 423/600 |
| 2003/0098529 A1 | * | 5/2003 | Drumm et al. ............ 264/624 |
| 2005/0019249 A1 | | 1/2005 | Noweck et al. |

FOREIGN PATENT DOCUMENTS

| | | | |
|---|---|---|---|
| DE | 24 46 094 | | 8/1993 |
| JP | 6128335 | | 12/1986 |
| JP | H06-263436 | | 9/1994 |
| WO | 00/09445 | * | 2/2000 |

OTHER PUBLICATIONS

Metallorganic Compounds as Preceramic Materials II. Oxide Ceramics, G. Pouskouleli, Ceramics International Elsevier Applied Science Publ, Barking, Essex, GB, vol. 15, No. 5, Jan. 1989, pp. 255-270.
A critical role of pH in the colloidal synthesis and phase transformation of nano size a-A12O3 with high surface area, Sharma et al., Journal of the European Ceramic Society Elsevier Science Publishers, Barking, Essex, GB, vol. 23, No. 5, Apr. 2003, pp. 659-666.
Structure of oxide gels and glasses by infrared and Raman scattering, Journal of Materials Science, vol. 24, 1989, pp. 3002-3010.

\* cited by examiner

*Primary Examiner* — Steven Bos
(74) *Attorney, Agent, or Firm* — Bushman & Associates, P.C.

(57) ABSTRACT

The present invention relates to a process for preparing boehmitic aluminas by hydrolysis of aluminum alcoholates in aqueous, alkaline solution. It further relates to aluminas or alumina hydrates prepared by this process and their uses.

14 Claims, No Drawings

PROCESS FOR PREPARING BOEHMITIC ALUMINAS HAVING A HIGH α-CONVERSION TEMPERATURE

BACKGROUND OF THE INVENTION

Field of the Invention

The present invention relates to a process for preparing boehmitic aluminas by hydrolysis of aluminium alcoholates in aqueous, alkaline solution. It further relates to boehmitic aluminas prepared by this process or aluminas obtained by calcination and to their uses.

The usefulness of an alumina-based catalyst carrier in general and for car exhaust gas catalysis in particular is characterised by physical properties, such as specific surface areas, pore volumes, and high surface stability. The intensity of the $\alpha$-$Al_2O_3$ conversion temperature, i.e. the temperature at which conversion into the alpha phase of the $Al_2O_3$ takes place, is a measure of high surface stability. With conventional boehmitic aluminas (aluminium monohydrates) this temperature can be as high as approx. 1150° C. and rarely max. 1300° C. The conversion temperature and thus the surface stability can be increased to a certain extent for example by doping with foreign metals, which, however, would result in contamination of the catalyst carrier and restrict its uses.

SUMMARY OF THE INVENTION

It is, therefore, an object of this invention to provide a process for preparing boehmitic aluminas having $\alpha$-$Al_2O_3$ conversion temperatures above 1200° C. and large pore volumes and surface areas, which does not result in contamination with foreign metals or foreign anions.

DESCRIPTION OF PREFERRED EMBODIMENTS

According to the present invention, the problem is solved by a process for preparing boehmitic aluminas by hydrolysis of aluminium alcoholates in aqueous, alkaline solution, wherein the hydrolysis is carried out at pH values above 8.5, preferably from 9 to 11 and the hydrolysis and/or the aging of the mixture resulting from the hydrolysis, preferably at least the hydrolysis, is carried out in the presence of substituted carboxylic acids, the salts thereof or their derivatives which during hydrolysis and/or the hydrothermal aging are at least partially converted into the free carboxylic acid or the dissociated form thereof having at least one additional substituent (in addition to the carboxy group of the carboxylic acid) selected from the group comprised of carboxy-, hydroxy-, oxo-, and amino groups. Preferably the aging is conducted for at least 30 min and more preferred as hydrothermal aging for at least 30 min and most preferred by employing stirring/mixing.

The dried products have $\alpha$-$Al_2O_3$ conversion temperatures above 1200° C.

In particular, the substituted carboxylic acid or its salt is added to the aqueous premix for hydrolysis in quantities of from 0.1 to 0.5 wt. %, preferably 0.2 to 0.4 wt. %, calculated as free acid and referring to the total mass, and preferably comprises independently hereof 2 to 12 carbon atoms, most preferably 2 to 8.

Examples of substituted carboxylic acids according to this invention include carboxylic acids which furthermore have one or more carboxy-, hydroxy-, oxo-, or amino group(s) or a combination thereof, particularly di- or tricarboxylic acids, hydroxycarboxylic acids, hydroxydicarboxylic acids, hydroxytricarboxylic acids, dihydroxydicarboxylic acids, oxocarboxylic acids, and amino acids. Hydroxydicarboxylic acids, hydroxytricarboxylic acids, dihydroxydicarboxylic acids, oxocarboxylic acids, and amino acids are preferred.

When the carboxylic acids used according to this invention are present as salts, it is preferable that ammonium salts, including for example alkanol ammonium salts, be employed. Also suitable are derivatives of the carboxylic acid employed according to this invention, which at least partially set free in the premix for hydrolysis the free acid or the dissociated form thereof.

Examples of useful substituted carboxylic acids within the meaning of the present invention include 2-hydroxypropionic acid, 2-oxopropanoic acid, hydroxybutanedicarboxylic acid, dihydroxybutanedicarboxylic acid, 2-hydroxypropane-1,2,3-tricarboxylic acid (citric acid), L-aspartic acid, L-serine, glycine, L-leucine, L-tyrosine, or L-tryptophane. Included amongst the particularly preferred substances are hydroxybutanedicarboxylic acid, dihydroxybutanedicarboxylic acid, 2-hydroxypropane-1,2,3-tricarboxylic acid (citric acid), L-aspartic acid, L-serine, glycine, or L-leucine.

In accordance with another embodiment of the present invention, the boehmitic aluminas prepared according to the invention can be subjected to additional hydrothermal aging. The aged products then have a conversion temperature above 1350° C., preferably above 1400° C. The aging step is carried out at temperatures ranging from 80° C. to 250° C., preferably from 120° C. to 220° C., more preferably from 130° C. to 220° C. most preferably from 200° C. to 220° C. and 205° C. to 215° C. Aging normally takes place from more than 1 hour or more than 2 hours to max. 20 hours for example, preferably 4 to 6 hours, and is preferably performed in a slurry having a solids content of preferably 2 to 17 wt. % prior to aging, most preferably 5 to 10 wt. %, referring to the total mass and calculated as $Al_2O_3$. The term 'slurry' as used herein is defined as a heterogeneous suspension of solid alumina hydrate in water.

The present invention also relates to high-purity boehmitic aluminas prepared according to the process of the invention, which comprise for example less than 40 ppm of sodium and less than 50 ppm of sulfate. Said boehmitic aluminas preferably have a lamellar or acicular crystal structure, depending on the type of carboxylic acid employed. The lamellar crystal structure is a structure wherein the crystals form plates. According to the acicular crystal structure crystals in the form of needles are build.

It is most preferable that the high-temperature boehmitic aluminas have large pore volumes and high specific surface areas.

The aluminas (including alumina hydrates) prepared according to the process of the invention are suitable as catalyst carriers.

According to the present invention, aluminium alcoholates comprising per Aluminium atom at least one alcoholate group are used for preparing high-purity boehmitic aluminas. The aluminium alcoholates can be prepared for example by the Ziegler process, wherein preferably one purification step is filtration. The aluminium alcoholates can be prepared for example from $C_1$- to $C_{24}$-alcohols or mixtures thereof.

The process of the invention yields high-purity boehmitic aluminas having particularly regular crystallite structures and significantly higher $\alpha$-$Al_2O_3$ conversion temperatures, especially after the slurry aging step.

The term 'α-Al$_2$O$_3$ conversion temperature' as used herein refers to the temperature at which during the thermal degradation of aluminium hydroxides the α-Al$_2$O$_3$ (also termed corundum) is formed. The final step of the known exothermal crystal lattice remodelling resulting in the energetically most favourable structure takes place at this temperature. However, lattice remodelling is concomitant with a drastic reduction of surface area and pore volume. A high conversion temperature has the advantage of providing a larger surface area and pore volume even at high temperatures and prior to conversion into α-Al$_2$O$_3$.

It has surprisingly been found that the boehmitic aluminas prepared according to the process of the invention excel by unusually regular crystal structures and the special physical properties attributable thereto. Having access to the boehmitic aluminas of the invention and their special physical properties is of great importance with respect to the further development of alumina-based catalyst carriers. In addition to the process for hydrolysing aluminium alcoholates, this invention therefore also relates to the aging and calcination of follow-up products obtained by hydrolysis.

The dried products obtained from unaged slurry are outstanding in that their conversion into α-Al$_2$O$_3$ takes place at above 1200° C. The dried products obtained for example from slurry aged at 210° C. for 5 hours excel by even higher α-Al$_2$O$_3$ conversion temperatures of about 1400° C. and much higher.

Pore volume and surface area of hydrothermally aged products are considerably higher in comparison with a product which was hydrolysed without additives. Aging can be done in closed apparatuses under the pressure generated thereby.

When using short-chain hydroxycarboxylic or oxocarboxylic acids for the hydrolysis, the α-Al$_2$O$_3$ conversion temperatures of the dried products obtained from slurries aged at 210° C. increase to nearly 1400° C. When using hydroxydicarboxylic- and dihydroxydicarboxylic acids, the α-Al$_2$O$_3$ conversion temperatures of the dried products obtained from slurries aged at 210° C. increase to above 1400° C.

At high temperatures, i.e. after calcination at 1300° C. for 3 hours, pore volume and specific surface area increase overproportionately with narrow and monomodal pore radii distribution. Both. α-Al$_2$O$_3$ conversion temperature and pore volume can be further increased with defined pore radii, when using hydroxytricarboxylic acids.

When employing amino acids, it is also possible to raise the α-Al$_2$O$_3$ conversion temperature above 1400° C.

Furthermore, the α-Al$_2$O$_3$ conversion temperature can be influenced by the type of carboxylic acid as well as by the amount of acid added. A larger quantity of substituted carboxylic acid in the premix for hydrolysis may lower the α-Al$_2$O$_3$ conversion temperature due to strong hindrance of the crystallite growth. A smaller quantity of substituted carboxylic acid would support precipitation of a conventional boehmitic alumina (not incorporated in the present invention). For example, when using citric acid, the optimum amount in the premix for hydrolysis would be 0.1 to 0.5 wt. % in order to reach the highest possible α-Al$_2$O$_3$ conversion temperature.

The hydrolysis temperature preferably ranges from 50° C. to 95° C., particularly from 70° C. to 95° C. It is essential that the pH value of the premix for hydrolysis be in the alkaline range, preferably above 8.5, more preferably above 9, most preferably between 9.5 and 11. For the purpose of the present invention the term 'premix for hydrolysis' is defined as the premix containing water and further additives prior to addition of the aluminium alcoholate, i.e. the mixture wherein hydrolysis takes place, once the alcoholate is added. The alkaline pH value of the premix for hydrolysis can be reached by adding suitable substances, such as ammonia, alkaline solution, or pH adjusters.

The monohydrates (boehmites) modified according to this invention, which are thus novel, show surprising high α-Al$_2$O$_3$ conversion temperatures and large pore volumes with defined pore radii. High purity of the products is ensured by the manufacturing process, namely the hydrolysis of aluminium alcoholate and mixtures thereof.

EXAMPLES

Example 1

Comparative Example, PURAL® 200

In a 2-liter three-neck flask 475 grams of water and 3.9 grams of a 25% ammonia solution were heated to 90° C. In this premix 400 grams of aluminium hexanolate were hydrolysed in three steps during 30 minutes while stirring and maintaining the temperature. Hydrolysis took 45 minutes in total yielding two immiscible phases: a supernatant alcohol phase and an alumina/water phase. After removal of the water-dissolved alcohol and measurement of the pH value ranging from 9.5 to 10.5, the resultant alumina suspension was aged at 210° C. for 5 hours under pressure (about 25 bar) and with stirring, followed by spraydrying.

Example 2

2-Hydroxypropionic Acid (Lactic Acid)

Example 1 was repeated using the following quantities:
475 g of water
3.9 g of ammonia solution (25%)
1.33 g of lactic acid (90% ig) in the premix
400 g of aluminium hexanolate
pH value prior to aging: 9.4

Example 3

2-Oxopropanoic Acid (Pyruvic Acid)

Example 1 was repeated using the following quantities:
475 g of water
3.9 g of ammonia solution (25%)
1.2 g of pyruvic acid in the premix
400 g of aluminium hexanolate
pH value prior to aging: 9.3

Example 4

Hydroxybutanedioic Acid (DL(±)Malic Acid)

Example 1 was repeated using the following quantities:
475 g of water
3.9 g of ammonia solution (25%)
1.2 g DL<±>malic acid in the premix
400 g of aluminium hexanolate
pH value prior to aging: 9.5

Example 5

Dihydroxybutanedioic Acid (L(+)-Tartaric Acid)

Example 1 was repeated using the following quantities:
475 g of water 3.9 g of ammonia solution (25%)
1.2 g L(+)-tartaric acid in the premix
400 g of aluminium hexanolate
pH value prior to aging: 9.5

Example 6

2-Hydroxypropane-1,2,3-tricarboxylic Acid (Citric Acid)

Example 1 was repeated using the following quantities:
475 g of water
3.9 g of ammonia solution (25%)
1.2 g of diammonium hydrogen citrate, calculated as citric acid, in the premix
400 g of aluminium hexanolate
pH value prior to aging: 10.0

Example 7

L-Aspartic Acid

Example 1 was repeated using the following quantities:
475 g of water
3.9 g of ammonia solution (25%)
1.2 g of L-aspartic acid in the premix
400 g of aluminium hexanolate
pH value prior to aging: 9.6

Example 8

L-Serine

Example 1 was repeated using the following quantities:
475 g of water
3.9 g of ammonia solution (25%)
1.2 g of L-serine in the premix
400 g of aluminium hexanolate
pH value prior to aging: 9.3

Example 9

L-Leucine

Example 1 was repeated using the following quantities:
475 g of water
3.9 g of ammonia solution (25%)
1.2 g of L-leucine in the premix
400 g of aluminium hexanolate
pH value prior to aging: 9.5

Example 10

Citrate Premix

Example 1 was repeated using the following quantities:
470 g of water
3.9 g of ammonia solution (25%)
4.8 g of diammonium hydrogen citrate, calculated as citric acid, in the premix
400 g of aluminium hexanolate
pH value prior to aging: 9.3

The products prepared in this way were analysed to determine $\alpha$-$Al_2O_3$ conversion temperature, surface area, pore volume, and average pore radius. The analytical results of Examples 1 through 10 have been compiled in Table 1.

The $\alpha$-$Al_2O_3$ conversion temperature was determined by simultaneous thermal analysis (STA). The heating rate was 10 K/min with air purge. STA comprises differential thermoanalysis and thermogravimetry. The surface area of the aluminas was measured by $N_2$ sorption analysis according to BET (DIN 66131). Pore volume and average pore radius were determined by mercury penetration (DIN 66133, contact angle 131°).

TABLE 1

| | $\alpha$-$Al_2O_3$-Conversion Temperature °C. | Surface * $m^2/g$ | Pore Volume * ml/g | Average Pore Radius * nm | Surface # $m^2/g$ | Pore Volume (up to 100/500 nm) # ml/g | Average Pore Radius (up to 100 nm) # nm |
|---|---|---|---|---|---|---|---|
| Example 1 | 1300 | 100 | 0.62 | 16 | 5 | 0.23/0.27 | 80 |
| Example 2 | 1394 | 135 | 1.08 | 11 | 8 | 0.39/0.57 | 81 |
| Example 3 | 1399 | 83 | 1.02 | 33 | 6 | 0.10/0.80 | 65 |
| Example 4 | 1427 | 126 | 1.26 | 15 | 41 | 0.74/1.08 | 25 |
| Example 5 | 1406 | 146 | 1.33 | 13 | 28 | 0.65/1.05 | 25 |
| Example 6 | 1445 | 117 | 1.24 | 17 | 47 | 0.93/1.44 | 27 |
| Example 7 | 1447 | 121 | 1.26 | 17 | 28 | 0.67/1.19 | 28 |
| Example 8 | 1433 | 101 | 1.15 | 30 | 7 | 0.12/1.03 | >100 |
| Example 9 | 1443 | 105 | 1.24 | 40 | 20 | 0.84/1.88 | 40 |
| Example 10 | 1309 | 168 | 0.79 | 7 | 5 | 0.14/0.29 | 60 |

Legend:
* Activation temperature: 550° C., 3 hours
Activation temperature: 1300° C., 3 hours

The invention claimed is:

1. A process for preparing boehmitic aluminas by hydrolysis of aluminium alcoholates in aqueous, alkaline solution forming a mixture, followed by hydrothermal aging, characterised in that
   (A) the hydrolysis is carried out at pH values above 9.5 at a temperature of from 50° to 95° C. and
   the hydrolysis and/or the hydrothermal aging of the mixture resulting from the hydrolysis is carried out in the presence of 0.1 to 0.5 wt. % of carboxylic acids having at least one additional substituent, the salts thereof or their derivatives which during hydrolysis and/or the hydrothermal aging are at least partially converted into the free carboxylic acid or the dissociated form thereof, wherein said at least one additional substituent is selected from the group consisting of hydroxy-, oxo- and amino groups; and
   (B) the boehmitic aluminas prepared in step (A) are subjected to an aging step at 120° C. to 250° C. for at least 1 hour to provide a boehmitic alumina which converts to an alpha phase only at a temperature of above 1350° C.

2. The process according to claim 1, characterised in that the substituted carboxylic acid, their derivatives or the salt thereof is added in quantities of 0.2 to 0.4 wt. %, referring to the total mass of the premix composition and calculated as substituted carboxylic acid.

3. The process according to any one of claims 1 or 2, characterised in that the substituted carboxylic acid, their derivatives or the salts thereof are selected from the group consisting hydroxycarboxylic acids, hydroxydicarboxylic acids, hydroxytricarboxylic acids, dihydroxydicarboxylic acids, oxocarboxylic acids, amino acids and mixtures thereof.

4. The process according to any one of claims 1 or 2, characterised in that the hydrolysis is carried out at a temperature of from 60 to 95° C.

5. The process according to any one of claims 1 or 2, characterised in that the aging step in (B) is carried out at temperatures ranging from 130° C. to 220° C., for at least 1 hour.

6. The process according to claim 5, characterised in that the aging step in step (B) is carried out in an aqueous environment with a solid matter concentration, calculated as $Al_2O_3$, at the beginning of the aging step ranging from 2 to 17 wt. %, referring to the total mass of composition subjected to aging.

7. A process for preparing boehmitic aluminas by hydrolysis of aluminium alcoholates in aqueous, alkaline solution forming a mixture, optionally followed by hydrothermal aging, characterised in that
(A) the hydrolysis is carried out by mixing the aluminum alcoholate with an aqueous alkaline premix containing a pH adjuster to provide a hydrolysis mixture and hydrolyzing the aluminum alcoholate in the hydrolysis mixture at pH values above 9 and at a temperature of 50 to 95° C. and
the hydrolysis and/or the hydrothermal aging of the mixture resulting from the hydrolysis is carried out in the presence of 0.1 to 0.5 wt. % of carboxylic acids having at least one additional substituent, the salts thereof or their derivatives which during hydrolysis and/or the hydrothermal aging are at least partially converted into the free carboxylic acid or the dissociated form thereof, wherein said at least one additional substituent is selected from the group consisting of hydroxy-, oxo- and amino groups; and
(B) the boehmitic aluminas prepared in step (A) are subjected to an aging step at 120° C. to 250° C. for at least 1 hour, to provide a boehmitic alumina which converts to an alpha phase at a temperature of above 1350° C.

8. A process for preparing boehmitic aluminas by hydrolysis of aluminium alcoholates in aqueous, alkaline solution forming a mixture, optionally followed by hydrothermal aging, characterised in that
(A) the hydrolysis is carried out at pH values above 9.5 at a temperature of from 50° to 95° C. and
the hydrolysis and/or the hydrothermal aging of the mixture resulting from the hydrolysis is carried out in the presence of 0.1 to 0.5 wt. % of carboxylic acids having an amino group, the salts thereof or their derivatives which during hydrolysis and/or the hydrothermal aging are at least partially converted into the free carboxylic acid or the dissociated form thereof; and
(B) the boehmitic aluminas prepared in step (A) are subjected to an aging step at 120° C. to 250° C. for at least 1 hour, to provide a boehmitic alumina which converts to an alpha phase at a temperature of above 1350° C.

9. The process of claim 1 wherein the hydrolysis is carried out by mixing the aluminum alcoholate with an aqueous alkaline premix containing a pH adjuster to provide a hydrolysis mixture and thereafter hydrolyzing the aluminum alcoholate in the hydrolysis mixture.

10. A process for preparing boehmitic aluminas by hydrolysis of aluminium alcoholates in aqueous, alkaline solution forming a mixture, optionally followed by hydrothermal aging, characterised in that
(A) the hydrolysis is carried out at pH values above 9.5 and the hydrolysis and/or the hydrothermal aging of the mixture resulting from the hydrolysis is carried out in the presence of 0.1 to 0.5 wt. % of carboxylic acids having an amino group, the salts thereof or their derivatives which during hydrolysis and/or the hydrothermal aging are at least partially converted into the free carboxylic acid or the dissociated form thereof; and
(B) the boehmitic aluminas prepared in step (A) are subjected to an aging step at 120° C. to 250° C. for at least 1 hour.

11. A process for preparing boehmitic aluminas by hydrolysis of aluminium alcoholates in aqueous, alkaline solution forming a mixture, followed by hydrothermal aging, characterised in that
(A) the hydrolysis is carried out at pH values above 9.5 at a temperature of from 50° to 95° C. and
the hydrolysis and/or the hydrothermal aging of the mixture resulting from the hydrolysis is carried out in the presence of 0.1 to 0.5 wt. % of carboxylic acids having at least one additional substituent, the salts thereof or their derivatives which during hydrolysis and/or the hydrothermal aging are at least partially converted into the free carboxylic acid or the dissociated form thereof, wherein said at least one additional substituent is selected from the group consisting of hydroxy-, oxo- and amino groups; and
(B) the boehmitic aluminas prepared in step (A) are subjected to an aging step at 120° C. to 250° C. for at least 1 hour.

12. The process according to any one of claims 1 or 2, characterized in that the aging step in (B) is carried out at temperatures ranging from 205° C. to 215° C.

13. The process according to claim 6, characterized in that the aging step in (B) is carried out at temperatures ranging from 130° C. to 220° C. for at least 2 hours.

14. The process according to claim 6, characterized in that the aging step in (B) is carried out at temperatures ranging from 205° C. to 215° C. for at least 2 hours.

* * * * *